United States Patent
Dotzel et al.

(10) Patent No.: US 11,196,325 B2
(45) Date of Patent: Dec. 7, 2021

(54) STATOR FOR AN ELECTRIC MACHINE

(71) Applicant: ZF FRIEDRICHSHAFEN AG, Friedrichshafen (DE)

(72) Inventors: Carsten Dotzel, Grafenrheinfeld (DE); Stefan Reuter, Hammelburg (DE); André Grübel, Königsberg (DE); Matthias Ebert, Himmelstadt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/482,097

(22) PCT Filed: Jan. 2, 2018

(86) PCT No.: PCT/EP2018/050021
§ 371 (c)(1),
(2) Date: Jul. 30, 2019

(87) PCT Pub. No.: WO2018/141492
PCT Pub. Date: Aug. 9, 2018

(65) Prior Publication Data
US 2020/0227985 A1   Jul. 16, 2020

(30) Foreign Application Priority Data
Jan. 31, 2017  (DE) .......................... 102017201533.0

(51) Int. Cl.
*H02K 3/12* (2006.01)
*H02K 3/28* (2006.01)
*H02K 15/085* (2006.01)

(52) U.S. Cl.
CPC ............. *H02K 15/085* (2013.01); *H02K 3/12* (2013.01); *H02K 3/28* (2013.01)

(58) Field of Classification Search
CPC .......... H02K 15/085; H02K 3/12; H02K 3/28; H02K 3/04; H02K 3/505; H02K 17/20; H02K 17/205
(Continued)

(56) References Cited

U.S. PATENT DOCUMENTS 3,465,188 A * 9/1969 Sisk .......................... H02K 1/16
                                                310/216.004
4,085,347 A * 4/1978 Lichius ................ H02K 15/024
                                                310/216.065
(Continued)

FOREIGN PATENT DOCUMENTS

| DE | 10 2014 111059 | 3/2015 |
| EP | 0 881 752 | 12/1998 |
| WO | WO 02/50977 | 6/2002 |

*Primary Examiner* — Ahmed Elnakib
(74) *Attorney, Agent, or Firm* — Cozen O'Connor

(57) ABSTRACT

A stator for an electric machine having an annular lamination stack with a longitudinal axis and slots extending along the longitudinal axis, at least three electrical phases, each of which has two partial strands, a plurality of rings connected in series to form a partial strand, a plurality of connection wires arranged to form a ring in adjacent layers of the slots, and a power connection for electrically connecting the stator. The connection wires are connected by pairs at a contacting side of the lamination stack for connecting adjacent layers at contacting areas. The power connection is arranged at the contacting side, and the connection wires are closed in each instance at an opposed contacting side opposite the contacting side.

15 Claims, 15 Drawing Sheets

(58) Field of Classification Search
USPC .................................................. 310/201, 179
See application file for complete search history.

(56) References Cited

U.S. PATENT DOCUMENTS

| | | | | |
|---|---|---|---|---|
| 5,691,590 | A | 11/1997 | Kawai | |
| 5,998,903 | A * | 12/1999 | Umeda | H02K 1/243 |
| | | | | 310/179 |
| 6,201,332 | B1 * | 3/2001 | Umeda | H02K 3/12 |
| | | | | 310/179 |
| 6,727,621 | B1 * | 4/2004 | Qu | A47L 9/28 |
| | | | | 310/113 |
| 7,005,772 | B1 * | 2/2006 | Frederick | H02K 3/28 |
| | | | | 310/179 |
| 9,166,451 | B2 * | 10/2015 | Han | B60L 15/20 |
| 9,444,296 | B2 * | 9/2016 | Funasaki | H02K 3/28 |
| 2002/0017825 | A1 * | 2/2002 | Oohashi | H02K 3/50 |
| | | | | 310/207 |
| 2003/0214196 | A1 * | 11/2003 | Cai | H02K 3/14 |
| | | | | 310/208 |
| 2006/0163959 | A1 | 7/2006 | Ogawa et al. | |
| 2012/0146447 | A1 * | 6/2012 | Seguchi | H02K 3/04 |
| | | | | 310/198 |
| 2015/0076953 | A1 | 3/2015 | Tamura | |
| 2019/0252957 | A1 * | 8/2019 | Onda | B21D 5/02 |
| 2020/0227985 | A1 * | 7/2020 | Dotzel | H02K 3/12 |

* cited by examiner

Fig. 5
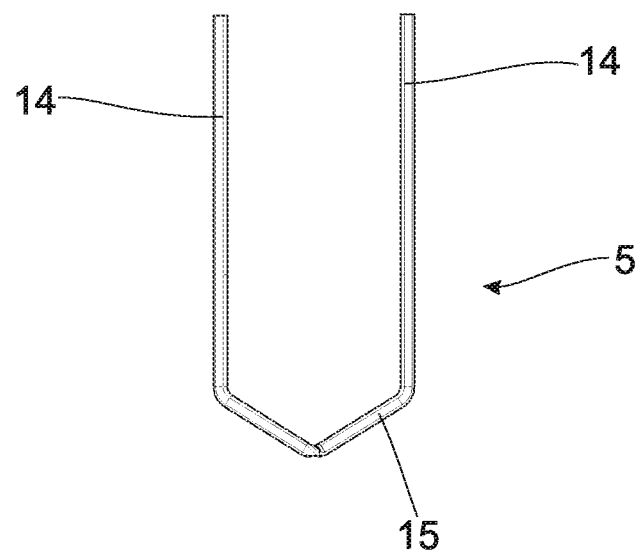
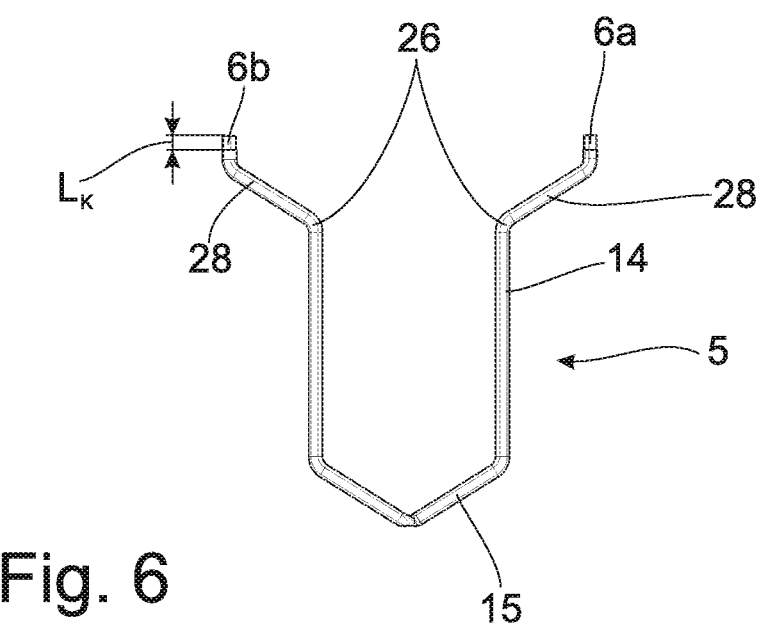
Fig. 6

Fig. 7
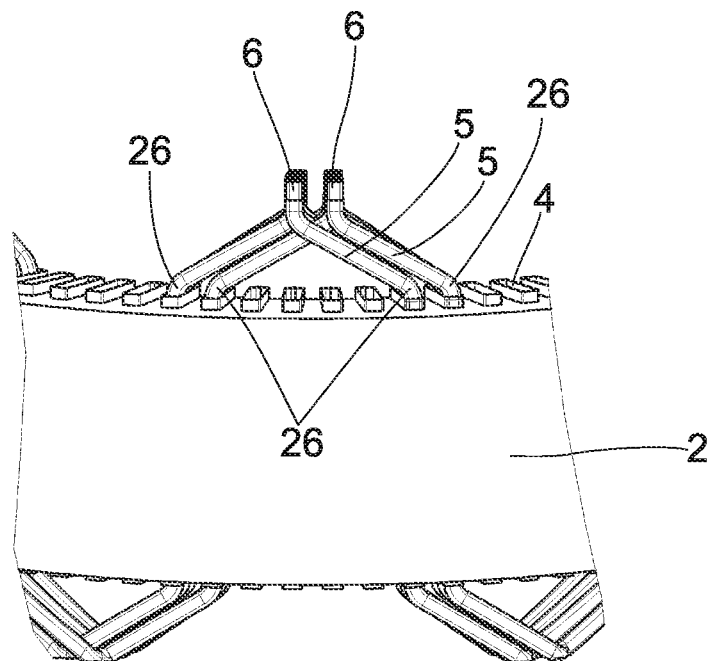
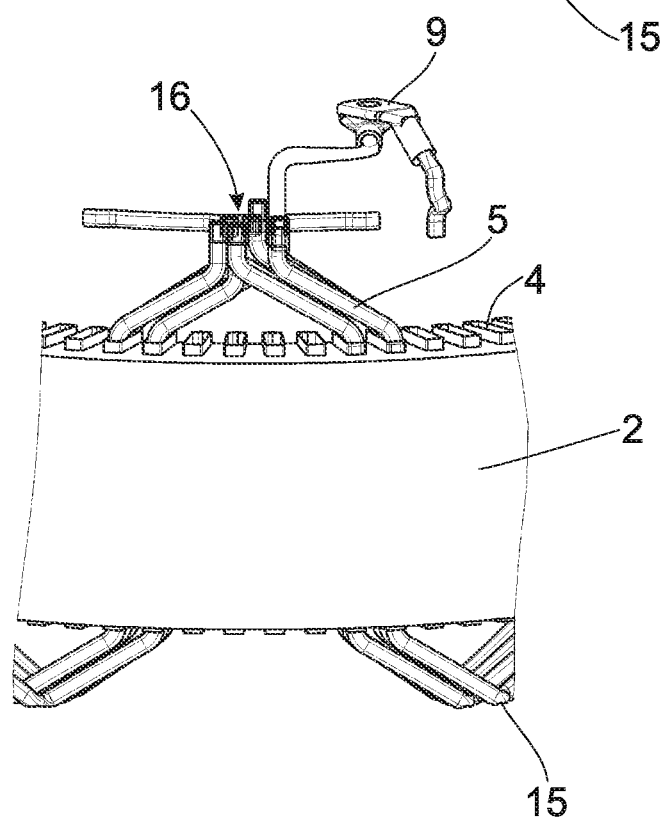
Fig. 8

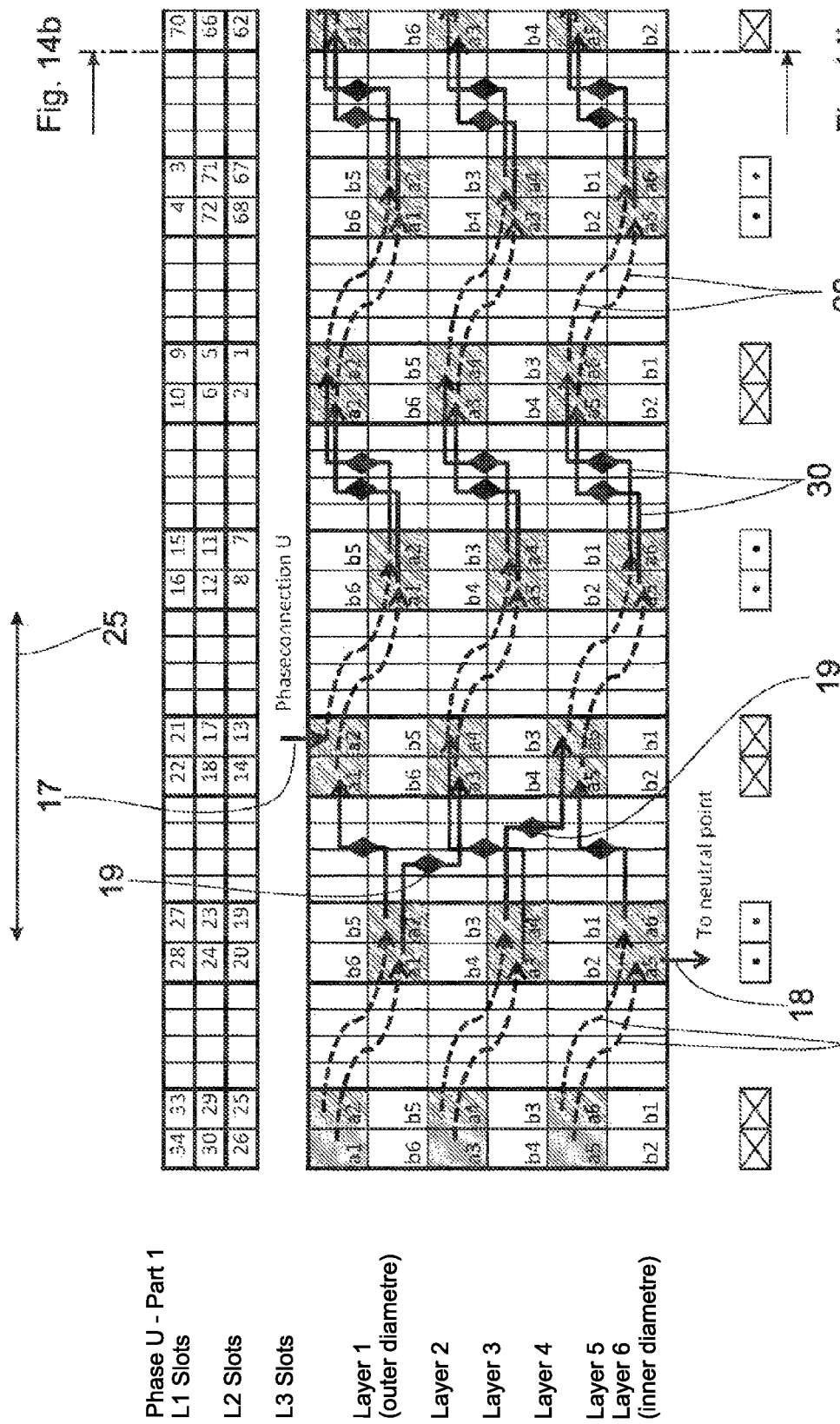

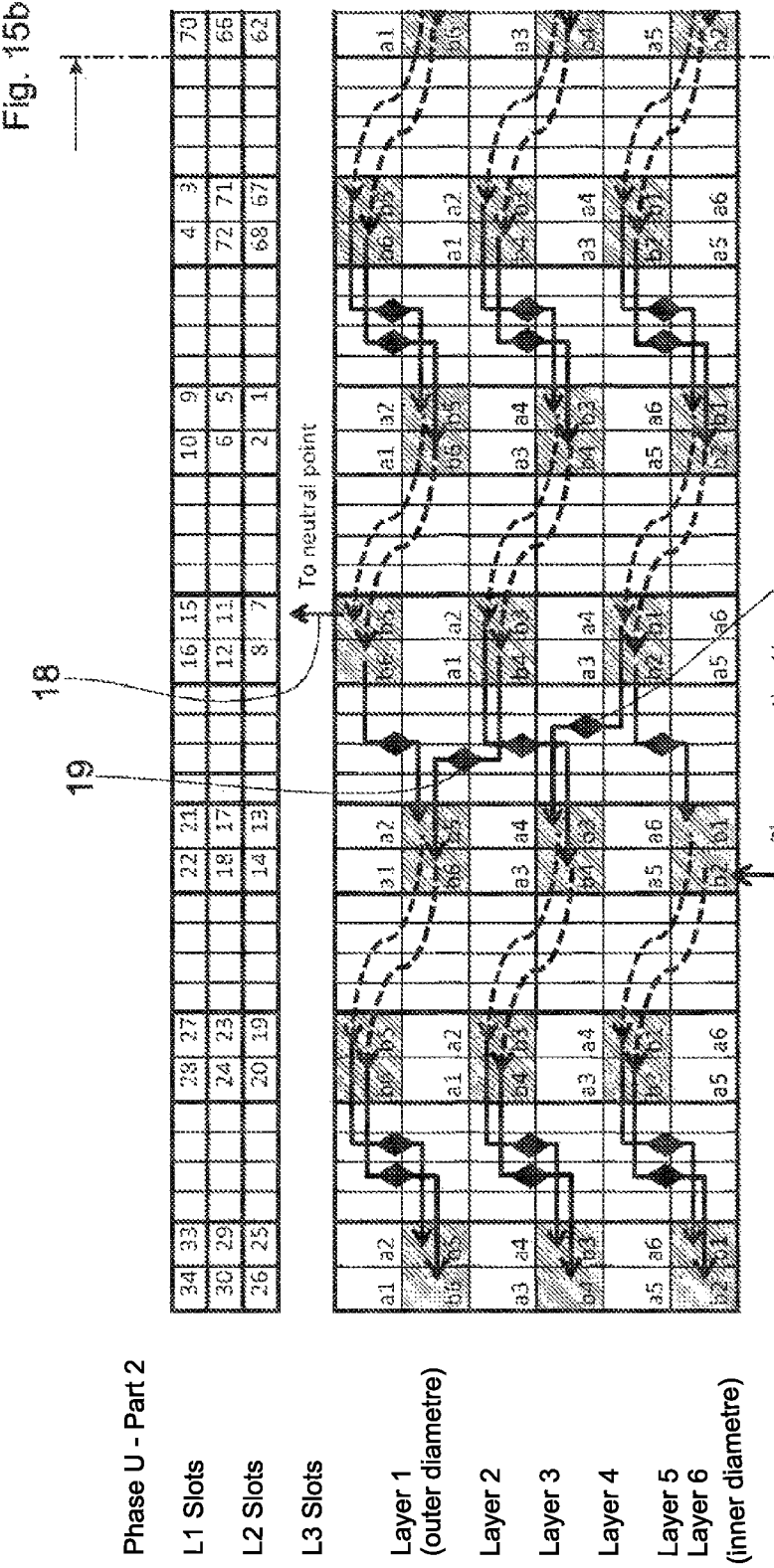

STATOR FOR AN ELECTRIC MACHINE

CROSS REFERENCE TO RELATED APPLICATIONS

This is a U.S. national stage of application No. PCT/EP2018/050021, filed on Jan. 2, 2018. Priority is claimed on German Application No. DE102017201533.0, filed Jan. 31, 2017, the content of which is incorporated herein by reference.

BACKGROUND OF THE INVENTION

1. Field of the Invention

The present invention is directed to a stator for an electric machine.

2. Description of the Prior Art

A stator is known from US 2015/0076953 A1. Connection wires are formed in the stator as so-called hairpins. The connection of the connection wires is carried out in a complex manner. In particular, it is necessary that the connection wires are formed as separate pins on one turn side so as to enable orderly contacting. A plurality of layers of connection wires arranged one above the other in order to ensure sufficient contacting between connection wires. The installation space required for the stator is extensive.

SUMMARY OF THE INVENTION

It is an object of one aspect of the invention to simplify the construction of the stator, in particular the implementation of the connection wires and the connection thereof.

To meet the above-stated object, a stator for an electric machine, particularly an electric motor, is provided. According to one aspect of the invention, construction of a stator can be simplified in that ends of connection wires, which are arranged in slots of a lamination stack of the stator, are connected to one another at a contacting side of the lamination stack, and a power connection for electrically connecting the stator is provided at the contacting side. Opposite the contacting side at an opposed contacting side, the connection wires are closed. The winding head height for the stator is reduced. The installation space for the stator is reduced. In particular, the connection wires of adjacent slots of a same phase are connected to one another, particularly welded to one another, in pairs at contacting areas. A substantial advantage of the stator according to the invention consists in that the power connection and the contacting areas are arranged on one side of the stator, namely, the contacting side. There are no additional connections, so-called bridges, necessary for the basic construction of the stator. The connection of individual slots is made possible owing to an inclination of the connection wires relative to the circumferential direction around the longitudinal axis of the lamination stack. The connection wires are offset relative to tangential direction in the area of the slots so that the contacting areas are offset. The two ends of a connection wire have a different radial distance with respect to the longitudinal axis. The different radial distance is determined particularly in such a way that it corresponds to the difference of a layer of a connection wire in the slot. The turn angle is changed. In view of the fact that there is no need for nesting of the connection wires, the contacting areas can be arranged substantially within a plane, this plane being oriented particularly perpendicular to the longitudinal axis of the lamination stack. The contacting areas are arranged uniformly in radial direction and in axial direction with respect to the longitudinal axis of the lamination stack. The stator has a compact construction. The stator is constructed to be small. In particular, a nesting of the connection wires can be dispensed with. A reduced winding step can be realized in this way. By "winding step" is meant the distance between adjacent slots that are encircled by the ends of a connection wire. In particular, with a hole count of two, the winding step of six according to US 2015/0076953 A1 can be reduced to five according to one aspect of the present invention. By "hole count" is meant the quantity of adjacently situated slots of the same phase. In particular, it is possible for a winding step of six according to US 2015/0076953 A1 to be expanded to seven according to one aspect of the present invention.

The two conductor legs of a connection wire, referred to as hairpin, are connected directly to one another. In radial direction with reference to the longitudinal axis, the conductor legs have a spacing corresponding to a layer thickness. In circumferential direction around the longitudinal axis, the spacing between the conductor legs amounts to the winding step. The winding step is generally given by the product of the phase number and the hole count. In the present case, three phases are given with a hole count of two. Correspondingly, the winding step amounts to six. The hole count can also be three or four.

As a result of contacting the connection wires on the contacting side, a closed circuit is formed. The quantity of closed circuits corresponds to the hole count of the respective phase. The closed circuits are connected to one another so as to form a ring.

In order to fill the layers of the slots, particularly completely, a second ring is provided which is constructed identical to the first ring. The second ring is installed to be mechanically turned at an angle relative to the first ring which corresponds electrically to a pole. Gaps in the slots of the first ring are filled by the second ring. Each ring has an input and an output. The quantity of rings can be expanded to any requirement, and every ring comprises two layers. The rings are electrically connected in series. The quantity of partial strands per phase is two in each instance irrespective of the quantity of rings connected in series. If all of the rings of each phase mounting are contacted, all of the slots are completely filled.

The slots extend in each instance along a longitudinal axis of the annular lamination stack. In particular, 72 slots are provided which are arranged along a circular line around the longitudinal axis of the lamination stack. In particular, the stator comprises exactly six partial strands. A quantity of six layers of connection wires is advantageous. The construction of the stator according to the invention allows a greater quantity of rings which, in particular, can be scaled optionally by even numbers, each ring comprising two layers. The power connection can be constructed in particular either via a cable harness at the wire ends as plug-in power board or via connection elements as add-on part.

A stator in which the partial strands are connected in each instance in parallel or in series with one another allows an advantageous connection of the two partial strands of the respective phases. Owing to the fact that the individual partial strands have an electrically symmetrical construction, there are only small circulating currents, if any, within the respective phase in the electric machine.

Wiring the phases as a star connection or as a delta connection allows an advantageous connection of the stator via the power connection by means of a prefabricated add-on part.

A construction of the stator in which each partial strand comprises at least two rings makes possible a compact, small construction. For example, each partial strand can comprise three, four or more rings.

The annular stator lamination stack can comprise an arrangement of individual sheet metal laminations and may be constructed in particular as a one-piece annulus. A stator lamination stack of this kind has the advantage that eddy currents can be prevented so that the efficiency of the stator is increased. In order to avoid short circuits when forming the lamination stack, the individual sheets can be coated with an insulating material. The use of silicon-containing steel for the sheet is advantageous for improved magnetic properties. Typically, the lamination stacks are produced by steps by cutting out the sheets, stacking, permanently joining, particularly gluing or welding, and possibly subsequent treatment if required. The subsequent treatment can comprise stress relief annealing, external cylindrical turning, deburring and recoating. It is possible to use thermosetting varnish for connecting the sheets to form stacks. The individually cut-out, in particular stamped, sheets are coated with thermosetting varnish, stacked one on top of the other and subsequently cured in an oven. The individual sheets are connected to one another and insulated.

The production of a stator in which the lamination stack has stacked lamination sheets, which are connected by a plurality of welds, in particular three welds oriented along the longitudinal axis, can be automated. In particular, the welds are arranged on the outer side. A lamination stack produced in this way is robust.

A stator with an insulating layer of the slots, particularly an insulating layer arranged respectively on the inner side, has improved electrical insulation properties. Arcing between the lamination stack and the windings of the coils can be prevented. In addition, the connection wire can be coated with an insulating varnish layer.

A stator in which the insulating layer is formed by an area insulation, particularly an insulating paper, laminate or foil, makes possible a particularly uncomplicated construction of the electrical insulation inside of the slot. In particular, it is possible to insulate the slot over the surface area.

A stator in which all of the connection wires are formed substantially identically makes it possible to produce the connection wires in an uncomplicated and advantageous manner. In particular, the connection wires are formed in a standard mold. One and the same tool can be used to shape the connection wires. The connection wires can be constructed differently in the slot area in that the conductor legs of the connection wires have different lengths. Specially shaped, individualized connection wires can be dispensed with. The cost of producing the connection wires and, therefore, the stator is reduced as a whole.

A stator with connection wires which are formed from flat wire allows a compact arrangement of the connection wires in the slots. The flat wire has particularly copper and/or aluminum. The connection wire has improved electrical and/or magnetic properties. The connection wire has improved thermal properties in particular.

The arrangement of the layers in the stator adjacent to one another along the longitudinal axis allows a small construction with reduced winding head height.

The symmetrical arrangement of parallel phases in a stator in which two parallel partial strands of a phase are arranged symmetrically allows circulating currents to be reduced.

BRIEF DESCRIPTION OF THE DRAWINGS

Further features, advantages and details of the invention are apparent from the following description of an embodiment example referring to the drawings. The drawings show:

FIG. 5 is an enlarged detail of a connection wire in the form of a hairpin according to a production flow showing the assembly shape of the hairpin;

FIG. 6 is a detail view corresponding to FIG. 5 of the connection wire in a follow-up production step showing the shape of the hairpin in the final state;

FIGS. 7 and 8 are arrangements of a plurality of connection wires;

FIGS. 14a, 14b are schematic views of the wiring diagram of the first partial strand of a phase from the outside to the inside;

DETAILED DESCRIPTION OF THE PRESENTLY PREFERRED EMBODIMENTS

Figure 1:
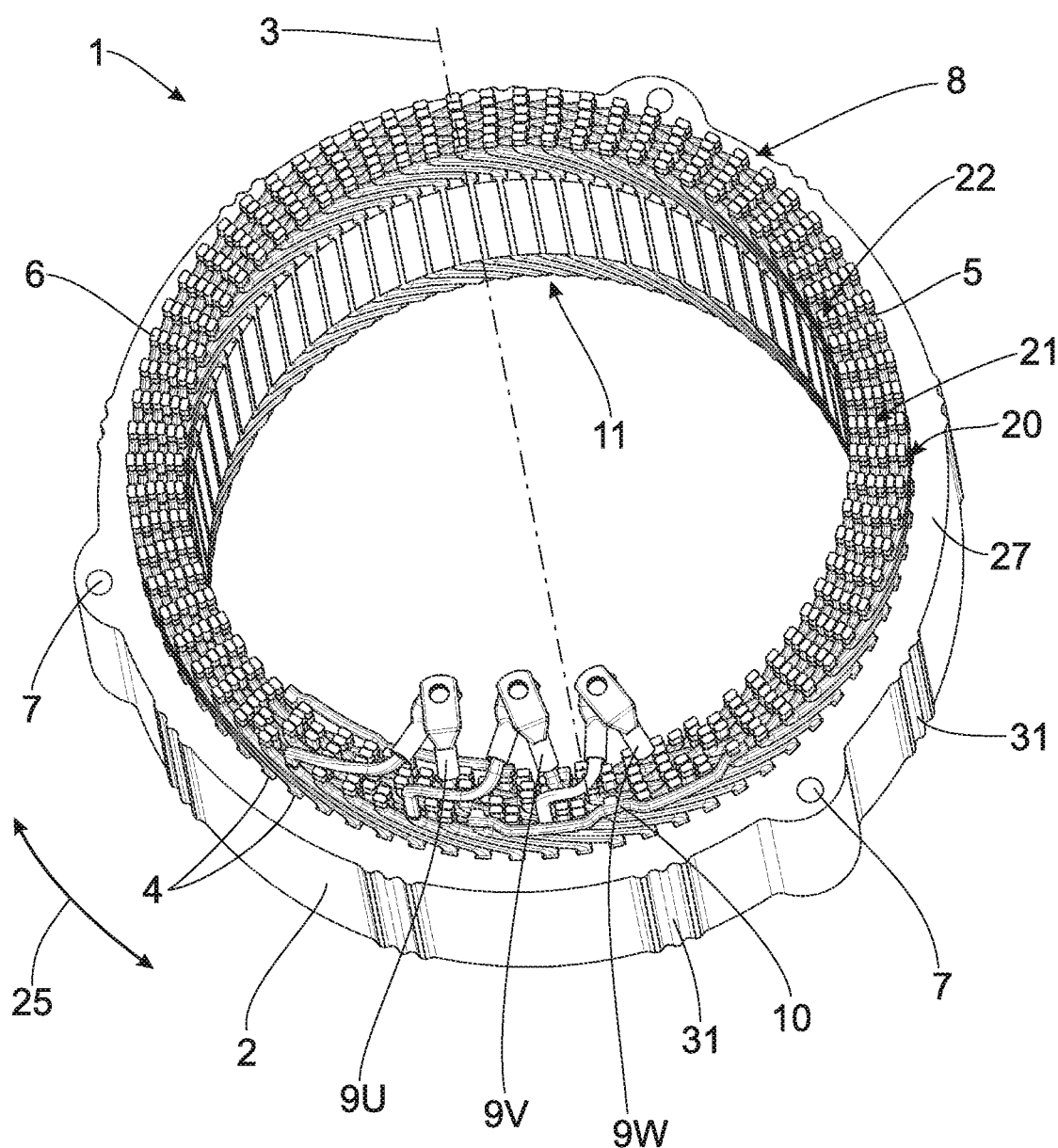
FIG. 1 is a perspective overall view of a contacting side of a stator.
Figure 2:
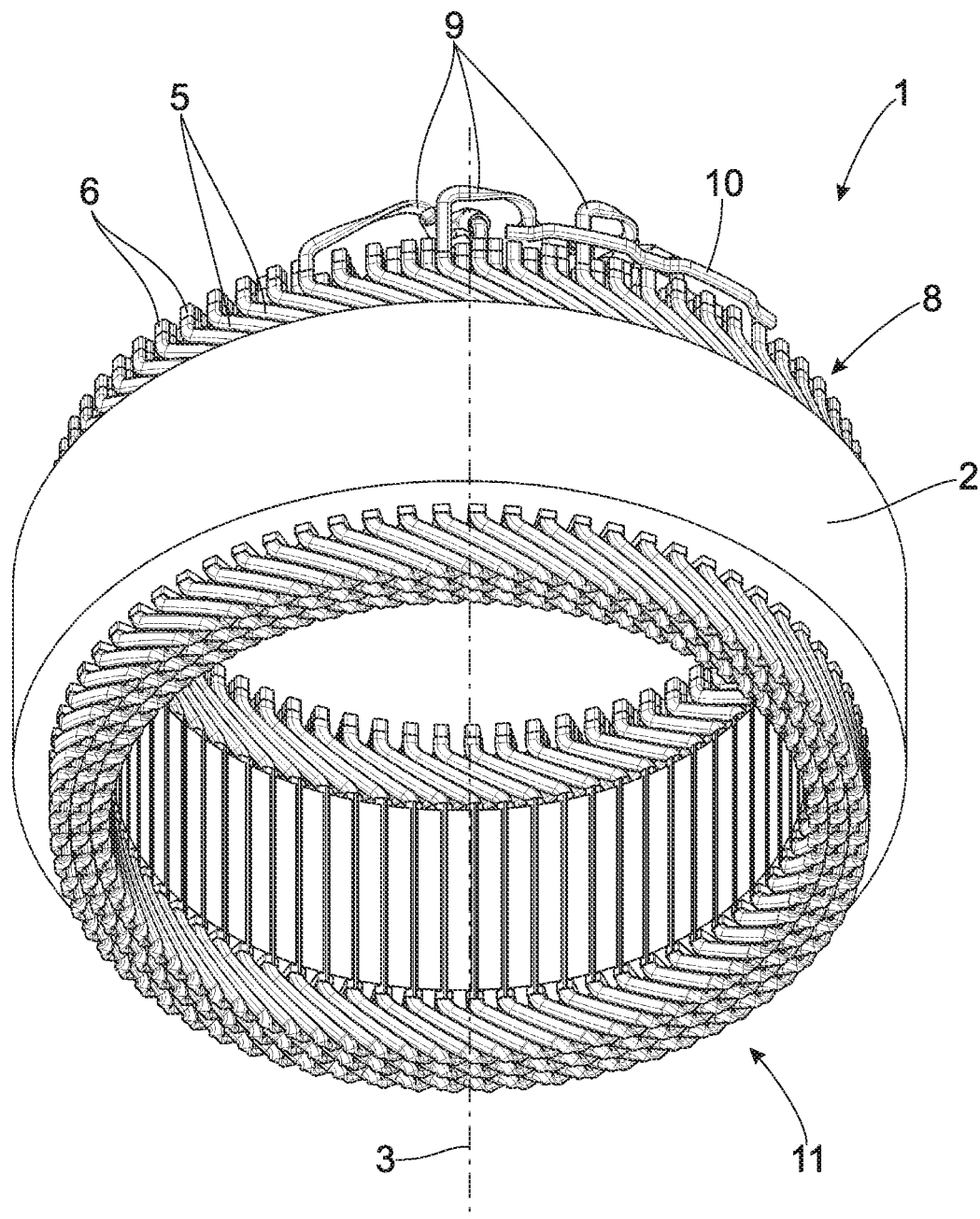
FIG. 2 is a perspective view of an opposed contacting side of the stator according to FIG. 1.
Figure 3:
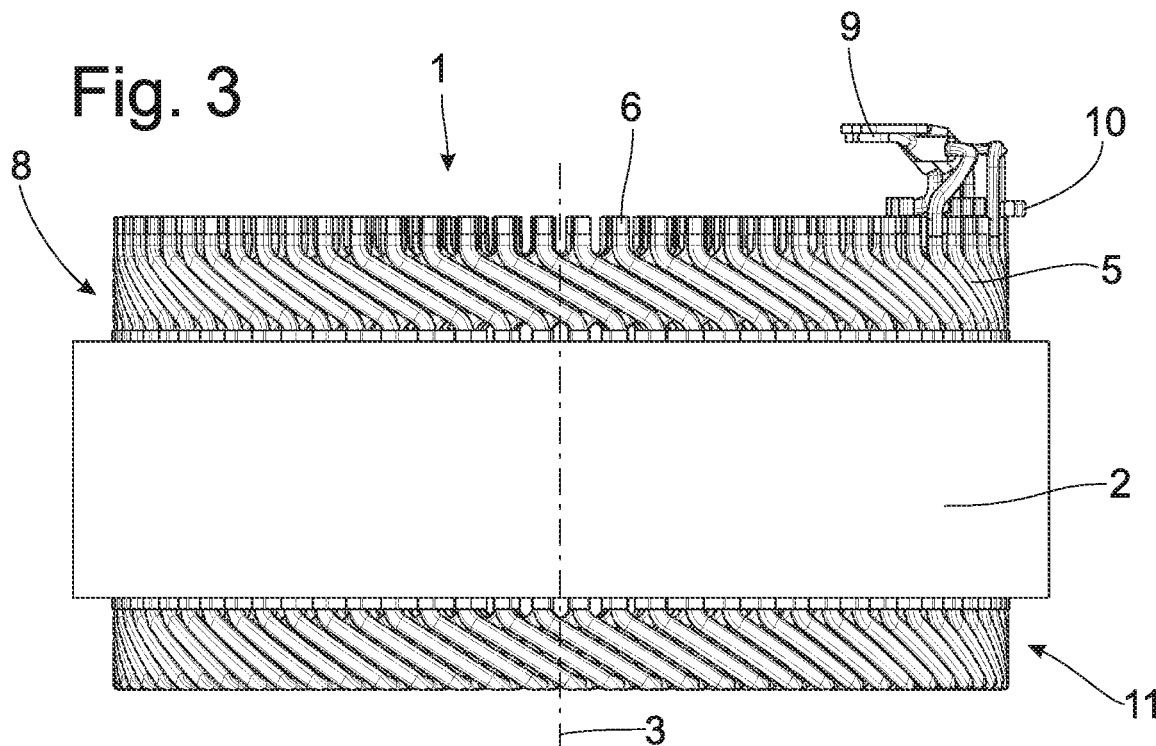
FIGS. 3, 4 are different side views of the stator according to FIG. 1.
Figure 4:
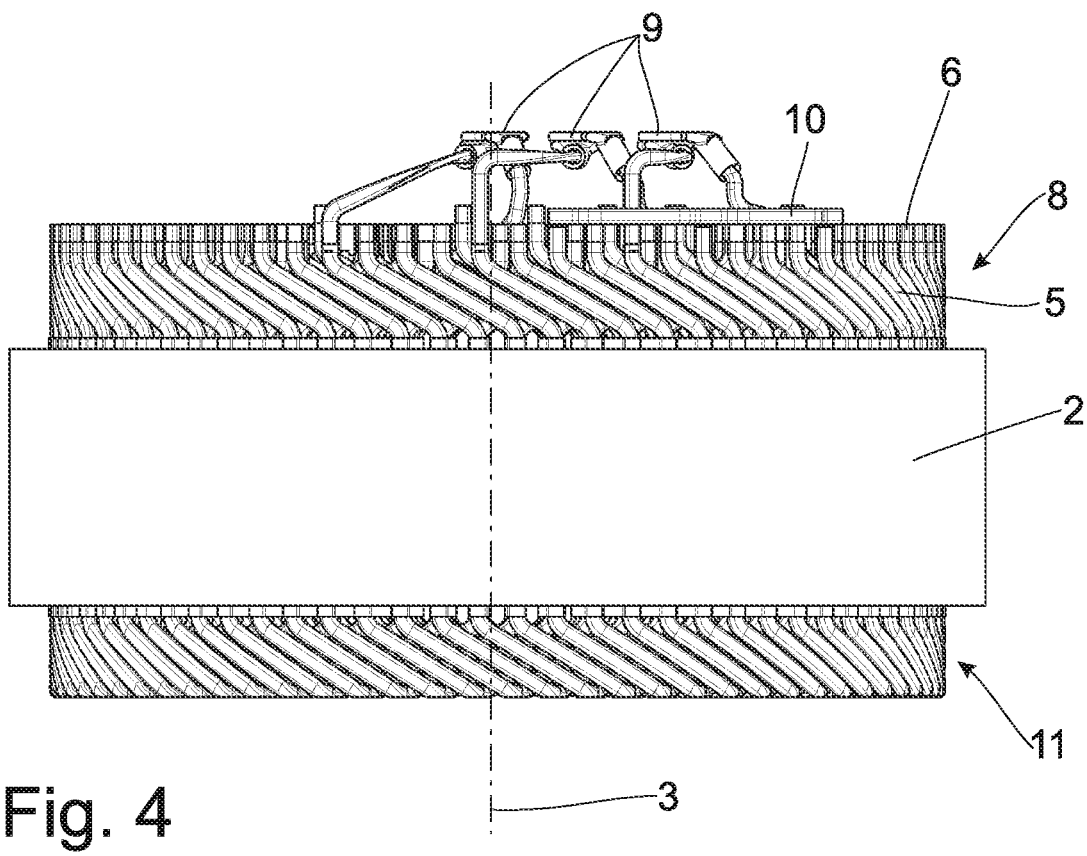

A stator 1 shown in FIGS. 1 to 4 is used in an electric machine, not shown in more detail, particularly an electric motor. Stator 1 has a multi-phase winding, according to the depicted embodiment example a three-phase winding, with phases U, V, and W. The construction and wiring of the phases will be described more fully referring to the following figures. The construction of the electric machine is not relevant. The specific embodiment example shows the stator 1 for an electric inrunner, although other constructions are possible.

Stator 1 comprises a lamination stack 2, which has an annular cross-sectional area with respect to its longitudinal axis 3. Lamination stack 2 has a plurality of, particularly 72, slots 4 extending along the longitudinal axis 3. Connection wires 5 are arranged, respectively, in the slots 4 in circumferential direction 25 around longitudinal axis 3 to form a ring 20, 21 or 22 in each instance. Slots 4 extend along the entire length of lamination stack 2 along longitudinal axis 3. Slots 4 are through-slots. In a radial direction to longitudinal axis 3, slots 4 have a radial length which is formed such that the connection wires 5 can be arranged adjacent to one another in radial direction in six layers. Slots 4 can also be formed such that more than six, for example, eight, ten or more, layers of connection wires 5 can be arranged in slot 4.

Connection wires 5 are substantially U-shaped, and the free ends of the 'U', referred to as contacting areas 6, are formed to contact another connection wire to form the ring 20.

According to the depicted embodiment example, lamination stack 2 is formed in circumferential direction as a one-piece lamination stack with three screw fastening points 7. Lamination stack 2 is, in particular, a stack of lamination sheets with outer welds 31 in axial direction of longitudinal axis 3.

Connection wires 5 are arranged to be identically oriented in lamination stack 2. All of the contacting areas 6 of connection wires 5 are arranged at an end face area 32 of lamination stack 2. This end face 27 of stator 1 is referred to as contacting side 8 or actuator ring side.

Figure 16:
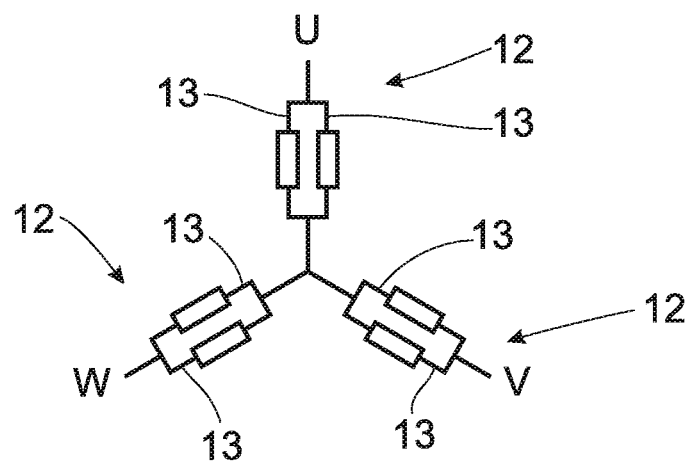
FIGS. 16, 17 are schematic views of the electrical construction of the stator.
Figure 17:
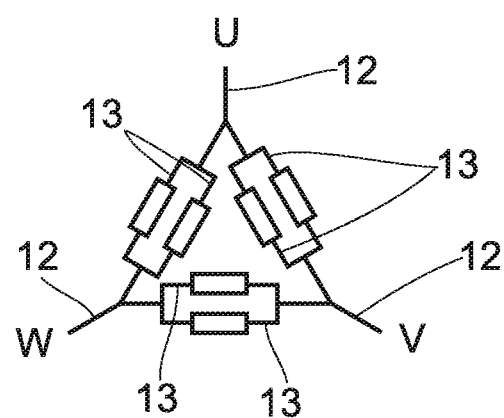

Stator 1 has the three electrical phases U, V, W, each of which corresponds to a strand 12. Each of the three strands has two partial strands 13, which are formed, according to the embodiment example, via star point 10 as a star connection according to FIG. 16. Alternatively, phases U, V, W can be formed as a delta connection with strands 12 having the two partial strands 13, respectively, as is shown in FIG. 17. Partial strands 13 are connected in parallel. Partial strands 13 can also be connected in series.

Each partial strand 13 is formed by three ring-shaped conductors in stator 1. Each ring 20, 21, 22 comprises a plurality of connection wires 5 which are arranged in two adjacent layers in the slots 4 of lamination stack 2. According to the depicted embodiment example, a first ring 20, 21, 22 comprises connection wires 5 in layers 1 and 2, a second ring comprises connection wires 5 in layers 3 and 4, and a third ring comprises connection wires 5 in layers 5 and 6. The numbering sequence of the layers proceeds from outside to inside in radial direction with respect to longitudinal axis 3.

Besides the contacting of adjacent connection wires 5 at contacting areas 6, the contacting at phase connections 9U, 9V, 9W is also carried out at contacting side 8. According to the depicted embodiment example, phase connections 9U, 9V, 9W for a second partial strand 13 are shown. Each of the three electrical phases U, V, W has two partial strands in each instance, each partial strand having a plurality of rings. A star point 10 is also shown in the area of phase connections 9 for the star-shaped connection of phases U, V, W of the second partial strand.

Opposite contacting side 8 is the opposed contacting side which is also referred to as the crown side 11 of stator 1. Connection wires 5 are closed in one piece in the area of crown side 11. Contacting is not required at crown side 11.

The production and attachment of connection wire 5 in the lamination stack 2 will be described more fully in the following referring to FIGS. 5 and 6. Connection wire 5 spreads apart proceeding from a narrow U-shape into the expanded U-shape shown in FIG. 5. In the expanded shape, the connection wire can be inserted into lamination stack 2 in a direction parallel to longitudinal axis 3. The parallel longitudinal pieces 14 are spaced apart in this way. The parallel longitudinal pieces 14 are also referred to as conductor legs. According to FIG. 5, connection wire 5 has a wide U-shape. Connection wire 5 is constructed as a flat copper wire. In the wide U-shape, connection wire 5 has two parallel longitudinal pieces 14 which are connected to one another via a connection piece 15. Connection piece 15 is substantially V-shaped and is connected in one piece with longitudinal pieces 14. In the area of connection piece 15, the connection wire 5 is twisted so that the two longitudinal pieces 14 are arranged in adjacent layers of slots 4. For example, one of longitudinal pieces 14 is arranged in the first layer of slots 4, and the other longitudinal piece 14 is arranged in the second layer of slots 4

In the arrangement shown in FIG. 5, the connection wire 5 is laid along longitudinal axis 3 into a slot 4. The spacing between the two longitudinal pieces 14 is selected such that a winding step of six slot spaces is given. All of the connection wires 5 of stator 1 are formed identically in the lower area opposite the free ends of longitudinal pieces 14, particularly of connection piece 15. After connection wires 5 with longitudinal pieces 14 have been inserted into slots 4, all of the longitudinal pieces 14 of a layer are bent in a direction along the outer circumference around longitudinal axis 3 around an imaginary bending axis or around a bending point 26.

After twisting, the connection wires 5 each have bending portions 28 axially opposite the connection piece 15 as is shown in FIG. 6. The bending portions 28 are formed integral with longitudinal piece 14. A bending portion 28 connects a respective contacting area 6a and 6b, respectively, to the corresponding longitudinal piece 14.

Bending portions 28 are directed way from one another such that the opening of the 'U' widens in the area of contacting areas 6a, 6b. Bending portions 28 are oriented substantially parallel to the corresponding portions of connection piece 15. With reference to a plane extending through the bending axis or the bending point 26 at connection piece 15, the longitudinal pieces 14 with the integrally arranged bending portion 28 and the contacting area 6a and 6b, respectively, and the portions of connection piece 15 are arranged mirror-symmetrically with respect to one another. Bending portions 28 are exposed in the assembled arrangement of connection wire 5, i.e., are arranged outside of slots 4. Longitudinal pieces 14 are arranged so as to lie in slots 4. Connection piece 15 is arranged in the area of crown side 11 of stator 1. Contacting areas 6a, 6b are arranged so as to protrude at contact side 8 of stator 1, i.e., are exposed.

Connection wire 5 is constructed mirror-symmetrically with two substantially S-shaped half-portions, which are connected to one another in one piece at the bending point. Contacting areas 6a, 6b have a cross-sectional area which corresponds to the wire cross section. The wire is a flat wire which has a substantially rectangular cross-sectional area. There are also other possible constructions of a wire, particularly a round wire. Contacting areas 6a, 6b extend along the longitudinal axis of the wire along contacting length $L_K$. Contacting areas 6a, 6b are three-dimensional contacting areas.

Connection wires 5 can be formed by one and the same mold tool. After connection wire 5 has been inserted into slots 4 of lamination stack 2 proceeding from the crown side 11, the ends of the longitudinal pieces 14 opposite the connection piece 15 are bent in circumferential direction around the longitudinal axis 3, and contacting areas 6 are formed in such a way that they extend substantially parallel to longitudinal axis 3.

Alternatively, it is possible to form the connection wires 5 by a stamping tool and/or bending tool. By means of a stamping tool, the bending point is defined at connection piece 15. By means of a bending tool, the bending portions 28 are bent at the ends of the connection wire 5 opposite the connection piece 15.

FIG. 6 shows the connection wire 5 as it is provided in the deformed arrangement in lamination stack 2. Owing to the twisting of the connection wire 5 in the area of connection piece 15, a first contacting area 6a is located in the first layer and a second contacting area 6b is located in the second layer. With the exception of a few connection wires 5, all of the connection wires 5 are bent uniformly in circumferential direction. This bending process is also referred to as twisting. It is key that the twisting direction depends on the layer arrangement. This makes it possible to arrange contacting areas 6 of adjacent connection wires 5 so as to contact one another as is depicted in FIG. 7. The contacting areas 6 which contact one another in this way are connected to one another by welding or another comparable joining method.

Figure 9:
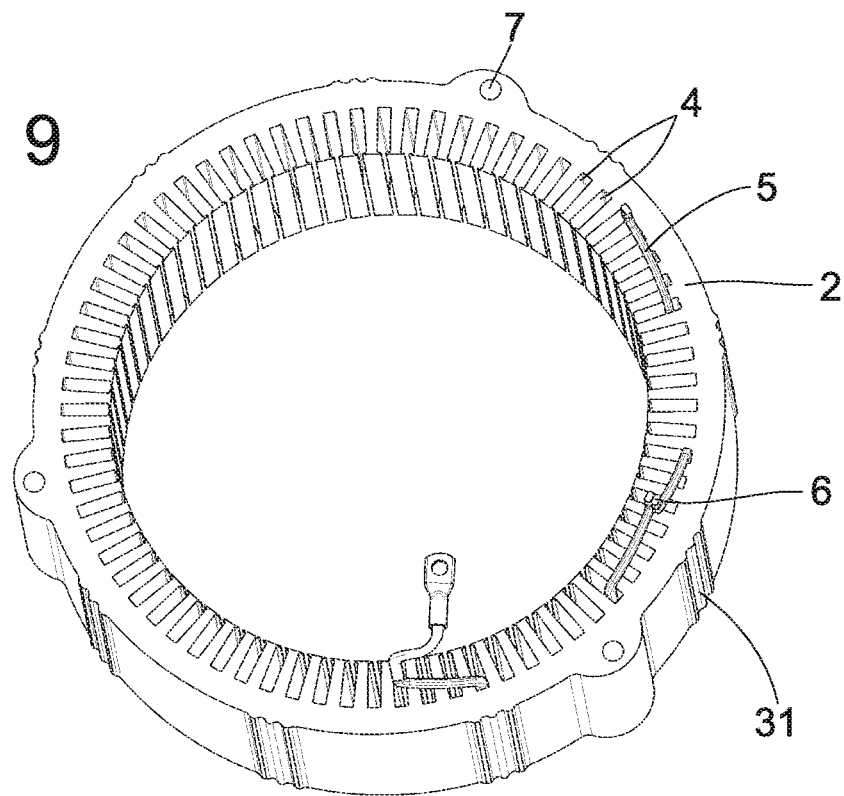
FIGS. 9 to 12 are stators in various production stages to illustrate the step-by-step manner of forming a partial strand for one of the electric phases.
Figure 10:
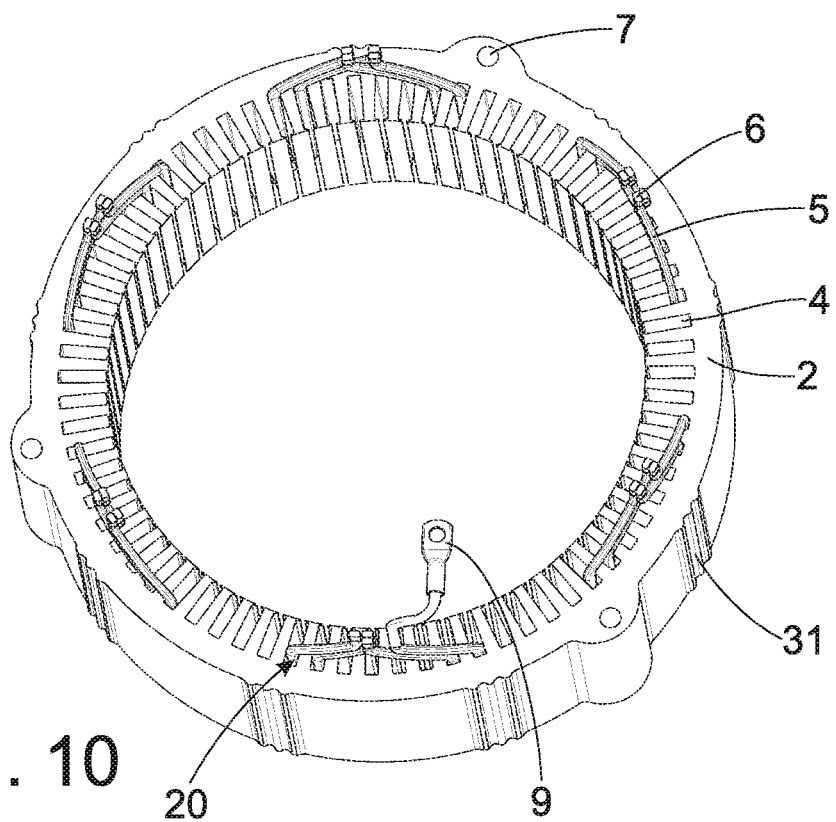

FIG. 9 shows the substantially empty lamination stack 2 in which two connection wires 5 are inserted, these two connection wires 5 being welded to one another in their overlapping area of contacting areas 6. According to FIG. 10, further connection wires are provided, all of which are arranged in the first layer and second layer.

An altered twisting angle is provided for connection wire 5 in the transitional area from first ring 22 to second ring 21 so that the first ring 20 which extends over layers 1 and 2 can be connected to the second ring 21 which extends over layers 3 and 4. This is shown in FIG. 8. It is key that a layer jump is carried out inside of a ring at contacting side 8, i.e., from layer 2 to layer 1, via the direct contacting, i.e., the welding of contacting areas 6. On the opposite crown side 11, a layer jump is carried out in the connection wire 5 itself via connection piece 15 from layer 1 to layer 2. This is repeated correspondingly for the following rings, for example, layers 5 and 6.

Figure 11:
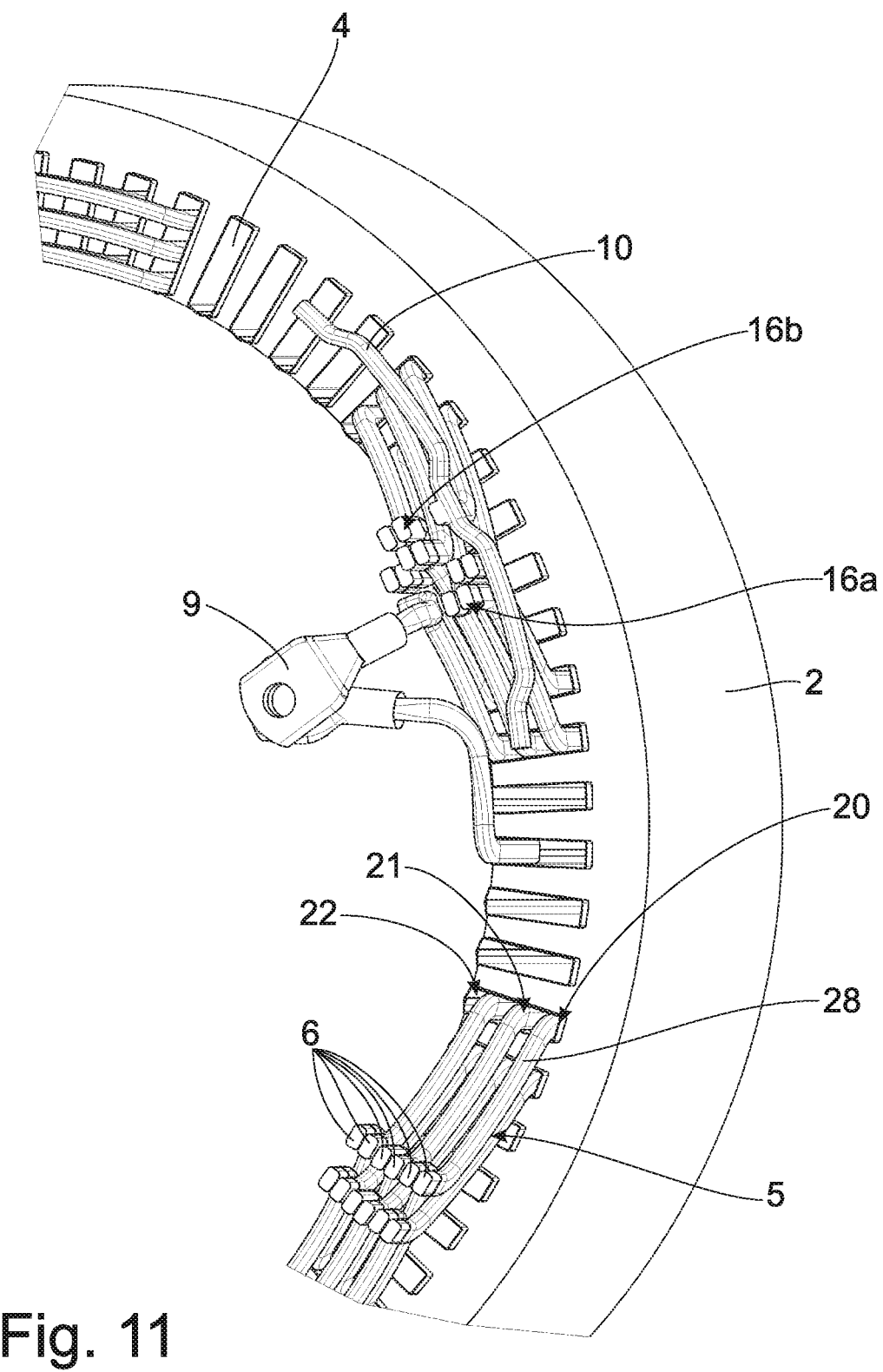
Figure 12:
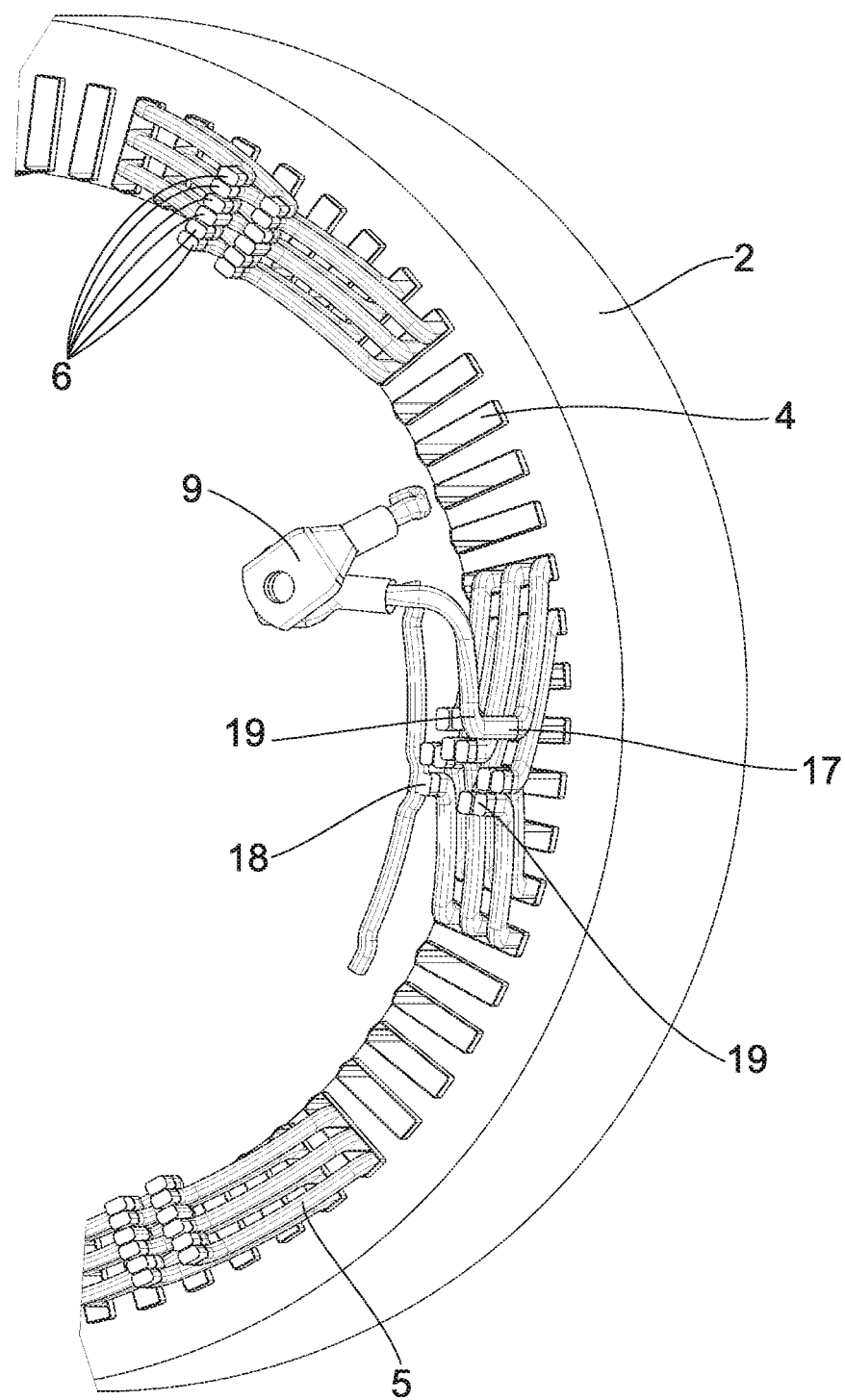
Figure 13:
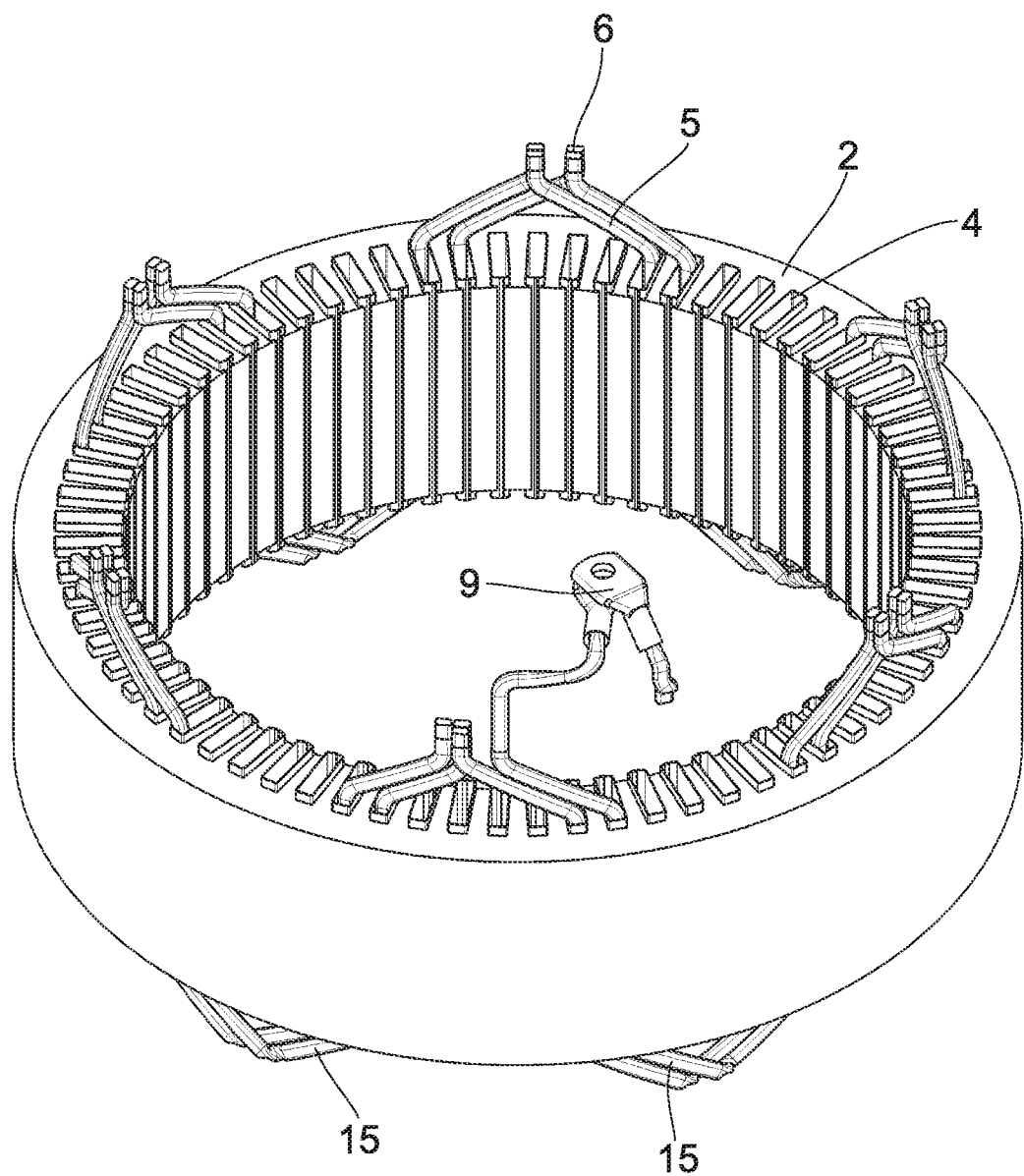
FIG. 13 is a perspective view of the stator to illustrate the wiring concept.

The connection of the rings is carried out via ring contacting points 16a, 16b as is shown in FIG. 11. In the area of the first ring contacting points 16a, the end of the first ring 20 with layers 1 and 2 is connected to the start of the second ring 21 with layers 3 and 4. Correspondingly, the end of layers 3 and 4 of the second ring 21 is connected to the start of layers 5 and 6 of the third ring 22 at the second ring contacting point 16b. Correspondingly, the start of first ring 20 with layers 1 and 2 forms the start of the first partial strand 13. The end of the first partial strand 13 forms the end of layers 5 and 6 of the third ring 22. The start of the first partial strand 13 is designated by reference numeral 17 in FIG. 12. The corresponding end 18 of the first partial strand 13 is shown correspondingly. The crossover connections 19 between the first ring and second ring and between the second ring and third ring are shown correspondingly.

Figure 14B:
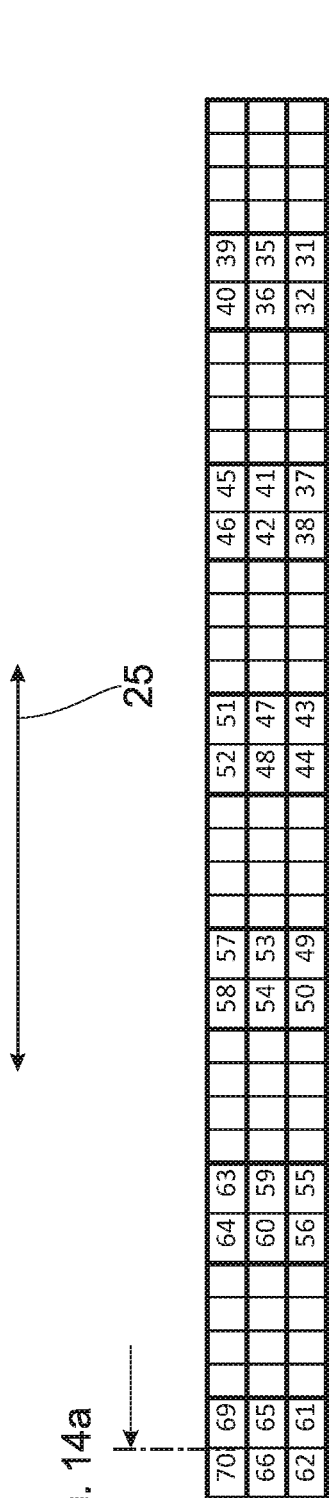
Figure 14B:
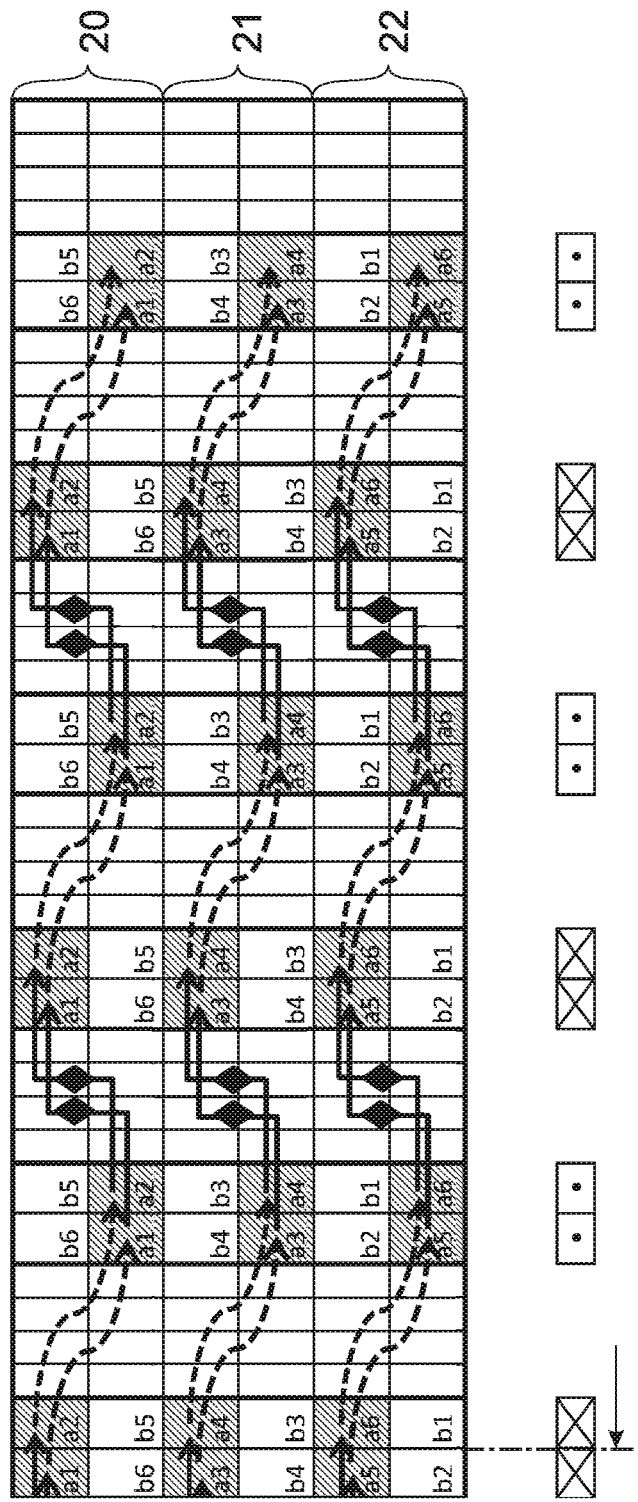

The accompanying wiring diagram for the first partial strand 13 is shown in FIGS. 14a and 14b. For the sake of clarity, FIG. 14 is divided into FIGS. 14a and 14b along circumferential direction 25. The first ring 20 comprises layers 1 and 2, the second ring 21 comprises layers 3 and 4 and the third ring 22 comprises layers 5 and 6. The wiring diagram schematically shows a winding of stator 1 in circumferential direction 25. The wiring of the first phase U is shown. In the lower area of the diagram, layers 1 to 6 are shown one above the other in line shape. Layers 1 to 6 represent the arrangement of the connection wires 5 in the slots 4. Layer 1 is arranged along the outer diameter of the stator 1. Layer 6 is correspondingly arranged at the inner circumference of stator 1.

In the upper area of FIGS. 14a, 14b, it is shown which slots are occupied by connection wires 5 of a ring with respect to a numbering in circumferential direction 25. It can be seen that connection wires 5 of first ring 20 are arranged in the slots numbered 3, 4 and 9, 10 and 15, 16 and 21, 22 and 27, 28 and 33, 34. The winding step amounts to six.

The wiring diagram with six layers is shown in the lower part of the diagram. Layer 1 denotes the outer layer. In the depicted embodiment example, two slots adjacent to one another in circumferential direction 25 are filled, respectively, with a phase U, V, W. The four remaining slots located therebetween in circumferential direction 25 are filled with the rest of the phases. Schematically, there is a sequence of first slot and second slot for phase U, third slot and fourth slot for phase V, and fifth slot and sixth slot for phase W; seventh slot and eighth slot starting again with phase U. This sequence applies in circumferential direction 25 for the entire stator 1. The layer jump inside of rings 20, 21, 22 at crown side 11 through the closed connection wires 5 according to FIG. 5 can be seen from the wiring diagram. This layer jump is denoted by dashed lines 29. A jumping back in the layer inside of the respective ring 20, 21, 22 is represented by a bold line 30 distinguished by a lozenge-shaped symbol. The lozenge-shaped symbol represents a contacting area 6 of connection wires 5. Contacting area 6 is also referred to as connection point. In addition to the layer jumps inside of the ring, the crossover connections 19 are likewise represented by a line with a lozenge-shaped symbol.

The three rings 20 to 22 are indicated schematically in FIG. 14b. The first partial strand of phase U is placed from the outside to the inside, i.e., from layer 1 to layer 6. A connection of phase U is made at the outer layer 1 through the start of partial strand 17 which is guided away at the end of partial strand 18 at inner layer 6.

Figures 15A, 15B:
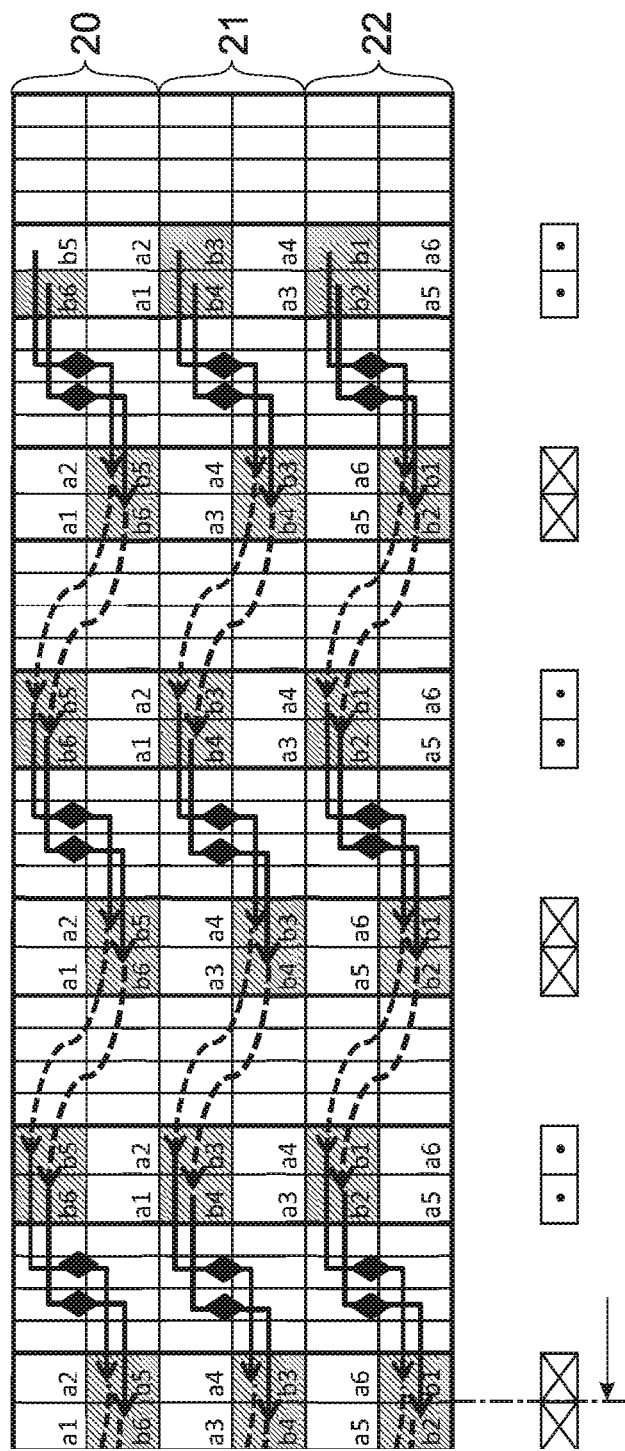
FIGS. 15a, 15b are views corresponding to FIG. 14 for the second partial strand of a phase from the inside to the outside.

FIGS. 15a, b show a corresponding wiring diagram for the second partial strand of phase U from the inside to the outside. The two wiring diagrams according to FIGS. 14 and 15 represent the two parallel partial strands 13 which are formed symmetrically with respect to one another. Circulating currents inside of a phase are accordingly prevented.

Figure 18:
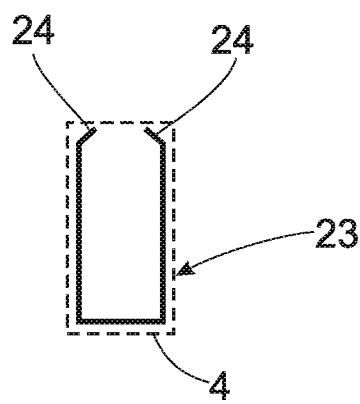
FIGS. 18 to 21 are schematic views of shapes imparted to an insulating paper in a slot of the lamination stack.
Figure 19:
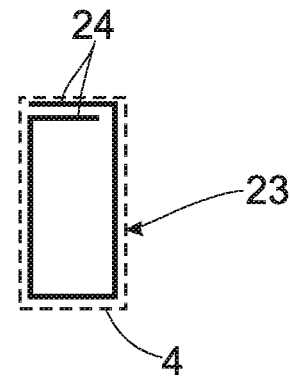
Figure 20:
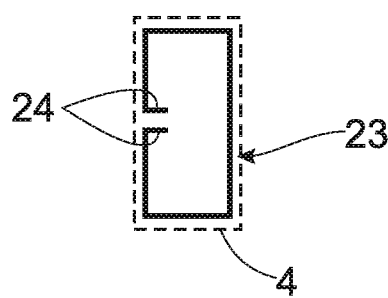

The configuration of an insulation of slots 4 will be described in the following referring to FIGS. 18 to 20. The respective slot 4 is shown in dashes. Each of the diagrams according to FIG. 18 to FIG. 21 shows a view of slots 4 with the insulating layer arranged therein in the form of insulating paper 23 in a plane perpendicular to longitudinal axis 3. An insulating paper 23 is provided in each instance for electrically insulating slots 4 and is shaped correspondingly. As an alternative to the insulating paper, a foil or a laminate of foil and paper can be provided. The aim is that the insulating paper 23 can be placed along the outer contour of the slot without a projecting collar.

This can be carried out, for example, with a substantially rectangular contour according to FIG. 18, the top of this contour having two end pieces 24 which are not joined.

According to FIG. 19, end pieces 24 are formed longer and overlap one another along the slot. Insulating paper 23 has a substantially closed contour.

Figure 21:
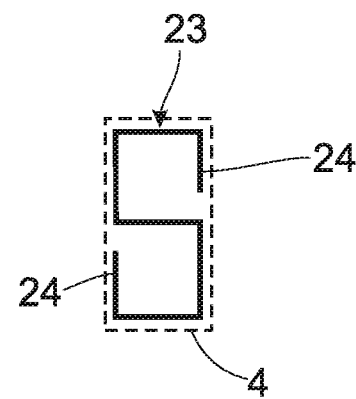

It is also possible to arrange end pieces 24, for example, in the form of a B or S according to FIG. 20 or 21.

It is key that an insulated space enclosed by the insulating layer offers sufficient space for the connection wires to be inserted. This makes the assembly of the stator possible in a reliable, defect-proof manner.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A stator for an electric machine, comprising:
    an annular lamination stack formed annularly in one piece having stacked lamination sheets connected by a plurality of welds and having a longitudinal axis and a plurality of slots, each of the plurality of slots extending parallel to the longitudinal axis;
    at least three electrical phases, each of which has two partial strands;
    a plurality of rings connected in series to form a partial strand of the two partial strands in each instance;
    a power connection arranged at a contacting side of the lamination stack and configured to electrically connect the stator;
    a plurality of connection wires arranged in the plurality of slots and configured to form at least one ring,
    wherein respective connection wires are connected by pairs at the contacting side and configured to connect adjacent layers at contacting areas, and
    wherein the connection wires are closed in each instance at an opposed contacting side opposite the contacting side,
    wherein two parallel partial strands of a phase are arranged symmetrically and in a same ring.

2. The stator according to claim 1, wherein the partial strands are connected in one of parallel and series respectively with one another.

3. The stator according to claim 1, wherein the at least three electrical phases are formed as one of a star connection and a delta connection.

4. The stator according to claim 1, wherein each partial strand comprises at least two rings.

5. The stator according to claim 1, further comprising:
    an insulating layer of the plurality of slots arranged at an inner side of each of the plurality of slots.

6. The stator according to claim 5, wherein the insulating layer is formed by an area insulation, respective ends of which are formed without collars.

7. The stator according to claim 6, wherein the insulating layer is one of an insulating paper, a laminate, or a foil.

8. The stator according to claim 1, wherein all of the connection wires are formed substantially identically.

9. The stator according to claim 1, wherein the connection wires are formed from flat wire.

10. The stator according to claim 9, wherein the connection wires are at least one of copper and aluminum.

11. The stator according to claim 1, wherein the layers are arranged adjacent to one another along the longitudinal axis.

12. The stator according to claim 1, wherein the plurality of welds are outer welds.

13. The stator according to claim 1, wherein the plurality of welds are oriented along the longitudinal axis.

14. The stator according to claim 1, wherein the annular lamination stack comprises a plurality of fastening points and the plurality of welds are arranged circumferentially spaced from each of the plurality of fastening points.

15. The stator according to claim 1, wherein each ring comprises two directly adjacent layers.

* * * * *